June 6, 1961     A. J. MONCRIEFF-YEATES ET AL     2,987,275
PROGRAMMED PATH LANDING SYSTEM Filed Aug. 25, 1958                              4 Sheets-Sheet 1

FIG. 1

INVENTORS.
WILLIAM P. YETTER
ALEXANDER J. MONCRIEFF-YEATES
BY
Edward A. Sokolski
AGENT

INVENTORS.
WILLIAM P. YETTER
ALEXANDER J. MONCRIEFF-YEATES
BY Edward A. Sokolski
AGENT

FIG. 4

INVENTORS.
WILLIAM P. YETTER
ALEXANDER J. MONCRIEFF-YEATES

AGENT 2,987,275
PROGRAMMED PATH LANDING SYSTEM
Alexander J. Moncrieff-Yeates, Fullerton, and William P. Yetter, Whittier, Calif., assignors to North American Aviation, Inc.
Filed Aug. 25, 1958, Ser. No. 756,959
22 Claims. (Cl. 244—77)

This invention relates to an instrument landing system and more particularly to an instrument landing system utilizing a programmed path which is derived in a calibrate mode during which a selected glide slope path is flown and a control mode during which the average of the "error" signal generated during the calibrate mode is utilized along with various compensating signals in effecting a landing with a predetermined touchdown point.

The widely used instrument low approach system permits operation only to ceiling minimums of approximately 150 feet due to inaccuracies of the system below this altitude. This places a minimum ceiling operational restriction of 150 feet and precludes an instrument landing under conditions of zero visibility and ceiling. The flare-out computer of the device of this invention eliminates this minimum ceiling restriction and enables the pilot to make a complete instrument landing either from information presented on a cockpit display or by connecting the output of the computer into an autopilot for an automatic landing. Such a landing can be accomplished without resort to special ground equipment (beyond the normal ILS system) as required by many other systems. This enables the handling of all types of aircraft without restrictions on landing rate due to equipment limitations.

The disclosed embodiment of this invention computes a landing flare path that will result in a touchdown within the specified range and sinking rate tolerances in the presence of external disturbances. Existing ground installations (Instrument Landing Systems) provide the necessary space geometry information for proper alignment during the approach to the runway. When this ground furnished information becomes unreliable at low altitudes, flare-out computer information is furnished to complete the approach and flare to touchdown.

Basically, the disclosed embodiment programs a fixed path in space from the end of the ILS beam at 150 feet altitude to touchdown. This fixed path is determined from the glide slope beam angle and an assumed air speed along this path. Should the air speed vary due to pilot error or wind gusts, computation is provided to modify the space path programmed in such a manner as to insure that the desired space path will still be followed. In effect, the flight program is speeded up or slowed down. This will cause a variation in the touchdown rate. This touchdown rate of course must be kept within predetermined limits. To bring about a flare, signals are introduced to make the space path programmer non-linear below flare initiation. A continual comparison between the programmed path in space and the actual path enables the aircraft to follow the program by feeding the error signals derived thereby to a control device. This control device may be in the form of an indicator, the pilot flying the aircraft to give zero indicated error, or may be an autopilot which automatically flies the aircraft to zero out the error signals.

The heart of the flare-out computer utilized in the device of this invention is a programmer which runs during the "control mode" at a rate proportional to the average rate of descent during the "calibrate mode" of the approach. The output of this programmer is an altitude command signal as a function of time. The rate of descent of an aircraft is determined as follows:

$$\dot{h} = V \tan \gamma \qquad (1)$$

where
$\dot{h}$ = rate of descent of the aircraft
$V$ = aircraft ground speed
$\gamma$ = flight path angle (measured between ground velocity vector and the local horizontal)

If the ILS glide slope path is followed, the angle $\gamma$ is fixed, and $$\frac{\dot{h}_1}{\dot{h}_2} = \frac{V_1}{V_2} \qquad (2)$$

where

The subscripts 1 and 2 for $\dot{h}$ and $V$ indicate ground speeds and rates of descent of different approaches.

Because the programmer runs at a rate of descent, $\dot{h}_\text{p}$ during the control mode which is equal to the average of the actual rate of descent $\dot{h}$ during the calibrate mode, $\dot{h}_\text{p} = \dot{h}$, and $$\frac{T_2}{T_1} = \frac{\dot{h}_{\text{p}1}}{\dot{h}_{\text{p}2}} \qquad (3)$$

where $T$ = running time from switchover (switching from calibrate to control mode) to zero altitude, and
The subscripts 1 and 2 indicate running times and programmer descent rates for any two different approaches.

If the programmed altitude is followed by the aircraft, $T$ becomes the time to touchdown from switchover and by substitution of (2) in (3)

$$\frac{T_2}{T_1} = \frac{V_1}{V_2} \text{ or } V_1 T_1 = V_2 T_2 \qquad (4)$$

The range, $R$ from switchover to touchdown is $$R = \int_{t=0}^{t=T} V \, dt$$

For a constant ground speed this becomes $R = VT$. As Equation 4 indicates, the device of this invention will keep $VT$ constant for all ground speed and time to touchdown combinations. Therefore, a constant range, $R$, requirement is met for all approaches regardless of ground speed. In this manner, the device of this invention by utilizing a programmed landing as derived from an ILS glide slope path, enables an instrument landing in which there is a constant touchdown point on the runway for all landing approaches.

It is therefore an object of this invention to provide a landing system which maximizes the use of more reliable and accurate available space information with a minimum reliance on less accurate data.

It is a further object of this invention to provide an instrument landing system in which the landing can be accomplished with a predetermined touchdown point.

It is another object of this invention to provide an improved instrument landing system.

It is still another object of this invention to provide an instrument landing system utilizing a calibrate mode in which a programmed landing path is derived and then utilizing this programmed information to effect a landing.

It is a further object of this invention to provide an instrument landing system utilizing ILS in conjunction with a flare-out computer utilizing a programmer.

It is a still further object of this invention to enable instrument landings under conditions of zero visibility and zero ceiling.

Other objects of this invention will become apparent from the following description taken in connection with the accompanying drawings in which.

Figure 1:
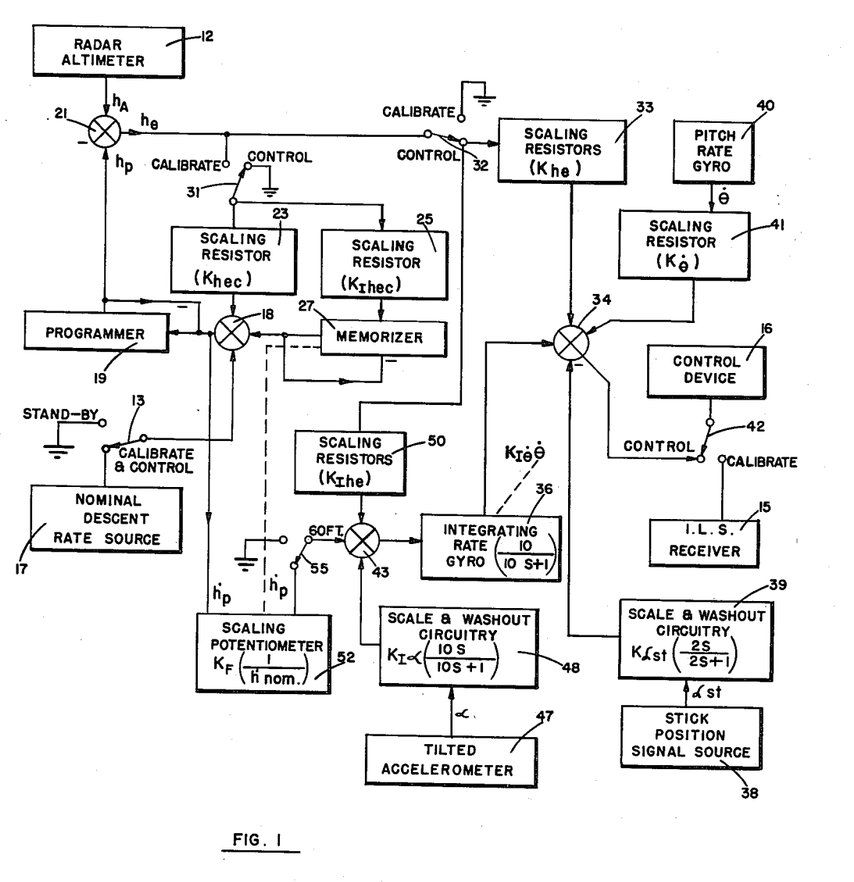
FIG. 1 is a block diagram of the device of the invention.
Figure 2:
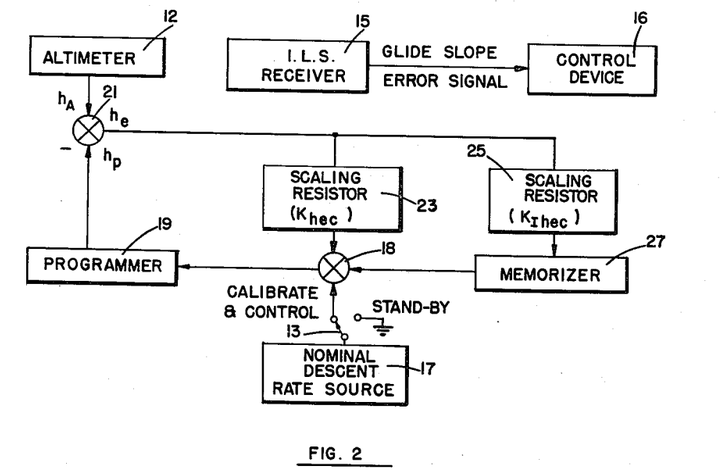
FIG. 2 is a block diagram illustrating operation during the calibrate mode.

Referring to FIG. 1, which is a general block diagram of the invention, and FIG. 2, which is a block diagram illustrating operation in the calibrate mode, the general features of the device of the invention will first be described.

Figure 4:
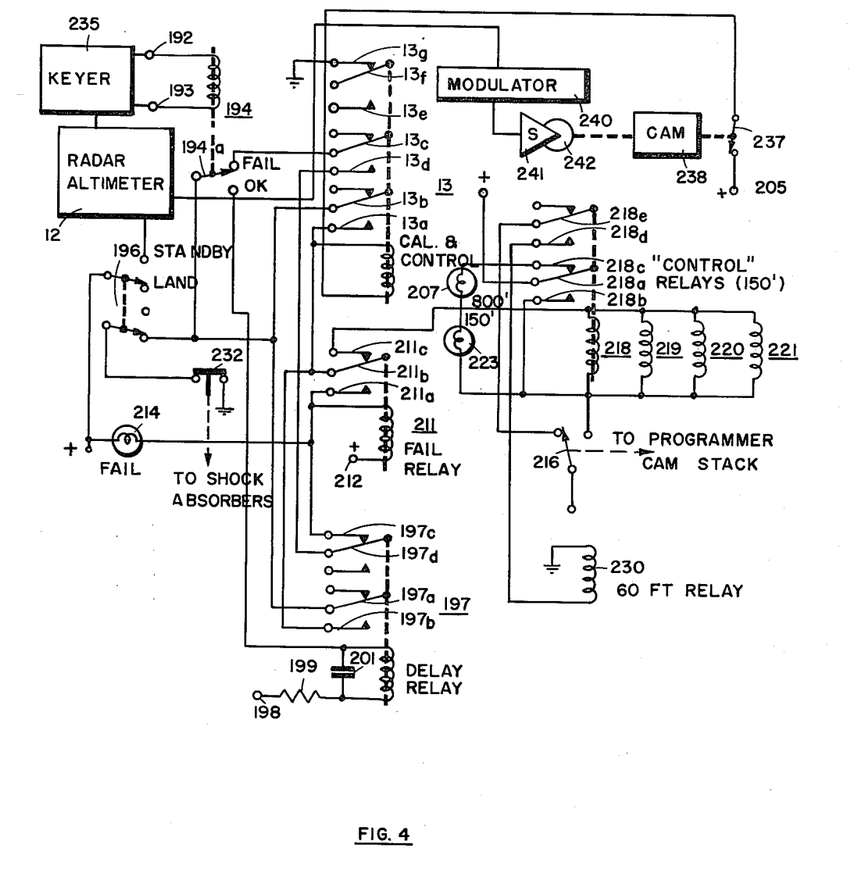
FIG. 4 is a schematic diagram of a relay system that can be used in the device of the invention.

When the pilot decides to land, he may throw an appropriate "standby-land" switch (FIG. 4). This switching operation, as will be explained in the description of the circuitry of FIG. 4, enables initiation of the calibrate mode. The calibrate mode, illustrated in FIG. 2, is operative from a predetermined altitude in the glide slope path which may be for example 800 feet to switchover to the control mode at approximately 150 feet altitude. Referring to FIG. 2, a radar altimeter 12 is used to provide an accurate indication of altitude within the 800'–150' range. This altimeter may be any highly accurate one which will provide an output voltage proportional to the altitude. When the aircraft is on the glide slope path (prior to and during the calibrate mode), an ILS receiver 15 operating in conjunction with the ground instrument landing system will provide a glide slope error signal output which is fed to control device 16. The control device may be an indicator (for example, a meter or cathode ray tube indicator) or may be an automatic pilot. In either case, the aircraft is flown to zero out the glide slope error signal either automatically or by the pilot flying to maintain a zero indication on the indicator device as is customary in the use of conventional ILS equipment. Thus, during the calibrate mode the aircraft is kept on the glide slope path.

To initiate the calibrate mode, switch 13 is thrown at a preselected altitude from the "standby" position to the "calibrate and control" position by appropriate means in the programmer 19 which will be explained in detail further on in the specification. When this switch is closed, the output of nominal descent rate source 17 is fed to comparing means 18 which sums its various inputs and feeds the algebraic sum of these inputs to programmer 19. The output of the nominal descent rate source 17 is a voltage representing the probable glide slope path descent rate of the aircraft in which the system is utilized. At the commencement of the calibrate mode, the nominal descent rate is the only signal which is fed into summing means 18. This nominal descent rate signal is fed to programmer 19 whose output is sent to comparing means 21. The output of the programmer is indicated as $h_p$. The output of altimeter 12 is also fed into comparing means 21, and is indicated as $h_A$. The signals $h_A$ and $h_p$ are fed to comparing means 21 in such a manner that the difference between their magnitudes is derived by comparing means 21 and appears in the output as altitude error signal, $h_e$.

The altitude error signal, $h_e$ is fed through scaling resistor 23 as a negative feedback signal to summing means 18. This negative feedback signal will add to or subtract from the nominal descent rate signal to produce an input to the programmer 19 and an $h_p$ output which will approach $h_A$ in value. This will tend to make the altitude error signal, $h_e$ approach zero.

The signal $h_e$ is also fed through scaling resistor 25 and memorizer 27 to summing means 18. This second negative feedback path operates in conjunction with the first to cancel out the error signal. However, it has a certain amount of inherent delay due to the nature of its components. The first feedback path through scaling resistor 23 forms a tighter feedback loop which is used to achieve a more instantaneous feedback response.

The second feedback path includes the memorizer 27 which memorizes or stores the error signal and later utilizes the stored signal to drive the programmer during the control mode. The memorizer summates or integrates all the altitude error signals, $h_e$ sent to it during the calibrate mode. This summated signal multiplied by the proper constants represents the average descent rate by which the nominal descent rate must be modified during the control mode to fly an extension of the glide slope path during this mode and arrive at the predetermined touchdown point.

It is to be noted that all during the calibrate mode, the glide slope path has been flown as closely as possible by conventional ILS procedures, and it is assumed that we actually have followed this path.

While the embodiment described herein utilizes a conventional ILS system for guidance of the approach of the aircraft during the calibrate mode, it will be readily appreciated that any suitable accurate guidance means may be used for this purpose. The instantaneous error signal represents the difference between the actual instantaneous altitude on the glide slope path as indicated by the altimeter and a nominal approximate altitude derived from the nominal descent rate source. The integral of the calibrate mode error signals represents the amount by which the nominal descent rate is to be corrected during the control mode to effect the predetermined touchdown.

For a general understanding of how the memorized signal is utilized during the control mode, let us now refer to FIG. 1, which is a general block diagram of the system. In FIG. 1 all the switches which operate in response to programmer 19 are shown as they would be during the control mode. During the control mode, memorizer 27 runs open loop except for a small amount of negative feedback. The open loop is effected by switch 31 which grounds out the input to scaling resistor 25 which is connected to the memorizer. The memorizer during the control mode has a fixed output signal proportional to the average altitude error signal. This memorized signal, which is indicative of the average altitude error determined and stored during the calibrate mode, is fed in voltage form to summing means 18 and added to the nominal descent rate voltage. It is to be noted that the sole function of the nominal descent rate source 17 is to produce a bias voltage which should approach the magnitude of the actual descent rate so that the error signal fed from the memorizer need not be of a very large magnitude to produce the proper altitude signal output from the programmer. In other words, it is a means for reducing the error voltage required to effectively operate the system.

Referring to FIG. 1, in the control mode the output of the programmer, $h_p$ represents the integration of the algebraic sum of the nominal descent rate and the output of the memorizer. Similar to operation in the calibrate mode, the output of the programmer, $h_p$ is compared with the output, $h_A$ of the radar altimeter 12 in comparing means 21. The output error signal, $h_e$, however, is no longer fed in a negative feedback path to the memorizer. It is rather fed through two paths. In one of these paths the error signal is fed through switch 32 and scaling resistor 33 to summing means 34. Here it is summed with the outputs of the integrating rate gyro 36, the stick position signal source 38 as scaled and washed out by scaling and washout circuitry 39 and the pitch rate gyro 40 as scaled by scaling resistor 41. The details of the functioning of each of the signal sources will be explained in detail as the description proceeds.

The scaled altitude error signal summated with the other enumerated signals in summing device 34 is fed to control device 16 through switch 42. The control device 16 can be an automatic pilot which will take the error signal and its summated associated signals and fly the aircraft in accordance with these signals, or it can be an indicating device which the pilot can use to fly the plane in accordance with these signals. Such an indicating device may be, for example, of the zero indication type, the pilot flying the aircraft so as to keep the meter needle or indicating scope at a predetermined "zero" indication at all times. Switch 42, operating in response to the programmer, disconnects the ILS receiver 15 from the control device and connects the voltage output of summing device 34 thereto when switchover occurs.

The integrating rate gyro 36 which is one of the devices whose output is fed to summing device 34 integrates the voltage output of summing device 43. Summing device 43 sums the "washed out" and scaled voltage output of the tilted accelerometer 47, a scaled altitude error signal and a flare-out signal. Tilted accelerometer 47 is tilted to receive accelerations on both the horizontal and vertical axes. The voltage output of the tilted accelerometer is scaled and washed out by scale and washout circuitry 48 and then fed to summing device 43. The details of the washout circuitry and the tilted accelerometer will be explained further on in the specification. Summing device 43 in addition receives a signal proportional to the altitude error signal, $h_e$, as appropriately scaled by scaling resistors 50. When a preselected altitude (such as 60 feet for example) is reached, as indicated by the programmer, switch 55, responsive to the programmer, also connects the voltage output of scaling potentiometer 52 to summing device 43. The input to the scaling potentiometer 52 is a signal indicative of the stored output of the memorizer. This is appropriately scaled by the scaling potentiometer 52 to produce a constant output voltage which is necessary under the circumstances to effect a proper flare-out in landing. This effectively modifies the programmed landing path during the last portion of the flight path before touchdown when the landing path should become non-linear to effect a proper touchdown. The integrating rate gyro 36 thus integrates these aforementioned signals along with its own self-generated pitch rate signal, and a voltage proportional to the integrated output is fed through summing means 34 to control device 16.

As indicated in FIG. 1, there is a negative feedback path from the output to the input of both programmer and memorizer. Such negative feedback is used to stabilize and linearize the operation of these units.

Figure 5:
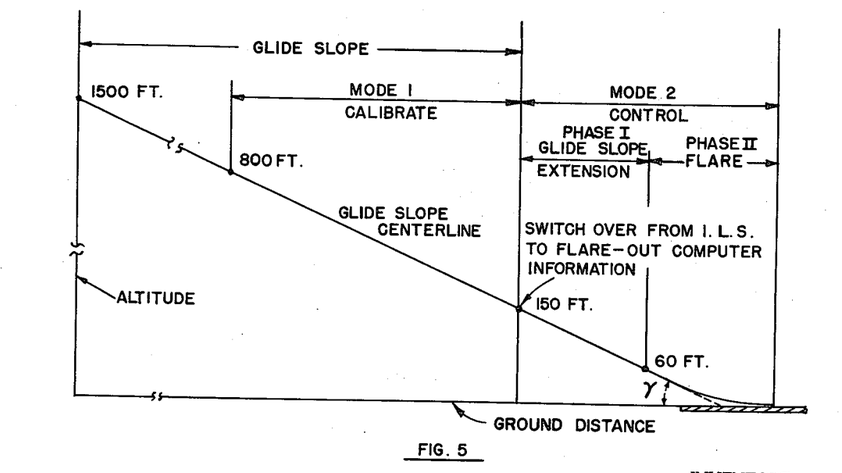
FIG. 5 illustrates a typical landing path flown by an aircraft utilizing the device of the invention.

Referring to FIG. 5, a typical landing path which might be flown by an aircraft utilizing the device of the invention is illustrated. As indicated, we might commence the glide slope path at 1500 feet altitude. A constant flight path angle $\gamma$ is maintained during the glide path. When we arrive at 800 feet altitude, we enter the calibrate mode and the programmer starts the descent rate calibration. At 150 feet we enter the control mode, and during this mode by maintaining the same descent rate we had during the calibrate mode, we fly an extension of the glide slope path with the same flight path angle $\gamma$. At 60 feet altitude, the programmer feeds in the flare-out signals to properly "ease off" the descent rate in effecting touchdown. These flare-out signals non-linearize the last 60 feet of the landing path as indicated.

The equation for the derivation of the error signal E to be fed to the control device 16 to fly the desired landing path is as follows:

$$E = K_{h_e}h_e - K_{\delta st}\left(\frac{2s}{2s+1}\right)\delta st + K_{\dot\theta}\dot\theta + \left(\frac{10}{10s+1}\right)\left[K_{I\dot\theta}\dot\theta + K_{I_{h_e}}h_e + K_F\left(\frac{\dot h_p^2}{\dot h_{nom}}\right) + K_{I\alpha}\left(\frac{10s}{10s+1}\right)\alpha\right]$$

(6)

The elements of this equation are indicated at their point of origin in FIG. 1 and are as follows:

$h_e$=altitude error signal from comparing means 21

$K_{h_e}$=scale factor imparted to $h_e$ by scaling resistor 33

$\delta st$=signal indicative of stick position from stick position source 38

$K_{\delta st}$=scale factor imparted to $\delta st$ by scale and washout circuitry 39

$\frac{2s}{2s+1}$=washout of $\delta st$ by scale and washout circuitry 39

$s$=the Laplace operator $\dot\theta$=pitch rate signal from rate gyro 40 and associated with integrating rate gyro 36

$K_{\dot\theta}$=scale factor imparted to $\dot\theta$ from pitch rate gyro 40 by scaling resistor 41

$\frac{10}{10s+1}$=washed out integration imparted by integrating rate gyro 36

$K_{I\dot\theta}$=scale factor inherent in $\dot\theta$ signal generated by integrating rate gyro 36

$K_{I_{h_e}}$=scale factor imparted by $h_e$ by scaling resistors 50

$\dot h_{nom}$=nominal or average predicted rate of descent for particular aircraft $\dot h_p$=programmed rate of descent=$\dot h_e + \dot h_{nom}$ $K_F\left(\frac{1}{\dot h_{nom}}\right)$=scale factor imparted to $\dot h_p^2$ signal by scaling potentiometer 52

$\alpha$=acceleration signal output from tilted accelerometer 47

$K_{I\alpha}$=scale factor imparted to "$\alpha$" by scale and washout circuitry 48

$\frac{10s}{10s+1}$=washout of "$\alpha$" by scale and washout circuitry 48

Further information on these elements will be presented later on in the specification.

The absolute values of the scale factors (prefixed in the equation by "K") can be derived for any particular type of aircraft in which the system is to be installed. Such derivation can be made by solution of the linear differential equations which represent the aerodynamic landing characteristics of the particular aircraft in question using techniques well known in the art. The solution of these equations may, for example, be accomplished by a suitable computer.

Figure 3:
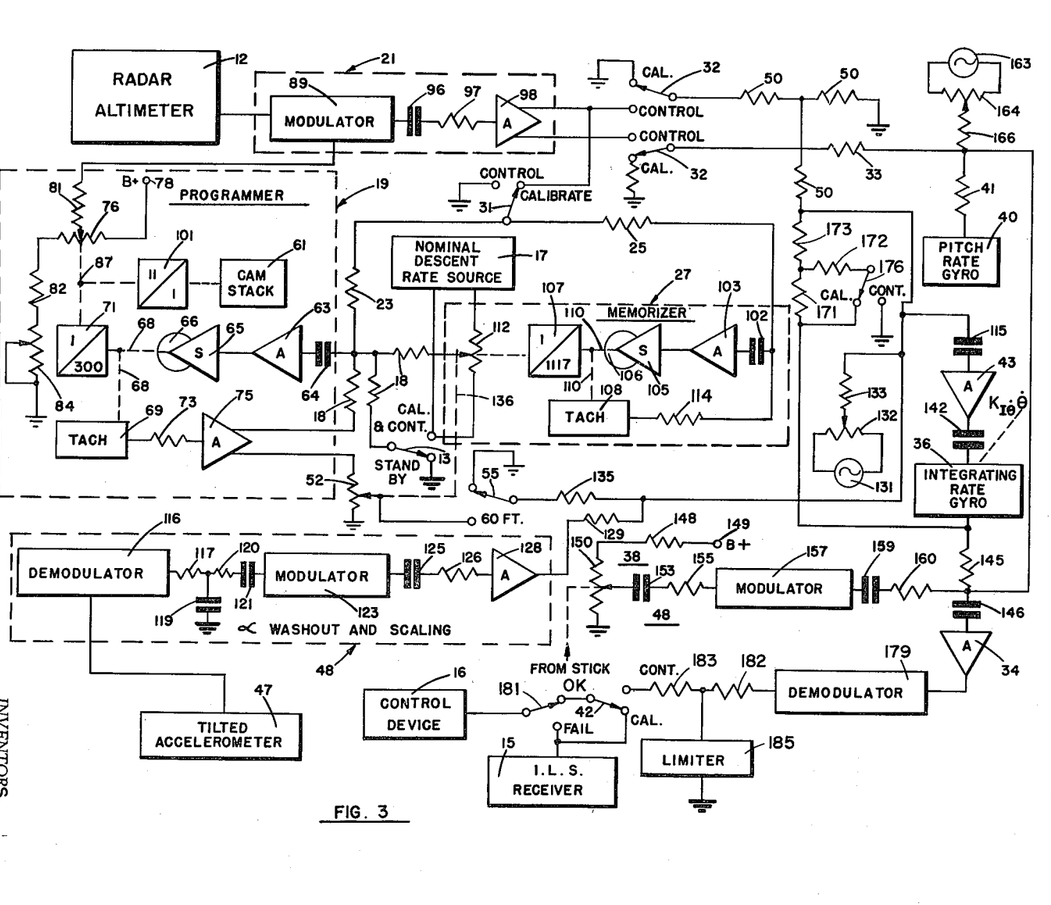
FIG. 3 is a functional schematic diagram of the device of the invention.

Let us now refer to FIG. 3 which is a functional schematic diagram of the device of the invention. The nominal descent rate source 17 may be a source of fixed alternating current. The exact magnitude of the nominal descent rate source output is determined for the particular aircraft in which the device is being installed and represents the expected descent rate this aircraft should have in a normal ILS (Instrument Landing System) landing path. This voltage, for example, in the U.S. Air Force type T-33 trainer, was set at 13 volts, R.M.S. When the aircraft enters the calibrate mode, switch 13 is thrown to the calibrate and control position (through the action of cams located in cam stack 61 more particularly described hereinafter in connection with FIG. 4) thereby connecting the alternating current output of the nominal descent rate source 17 through one of summing resistors 18 and coupling capacitor 64 to amplifier 63 in the programmer 19. Amplifier 63 is a conventional voltage amplifier that can be of any suitable design to provide adequate drive for power amplifier 65 which it drives. Power amplifier 65 drives a motor 66 having a motor output shaft 68 simultaneously driving a tachometer 69 and a reduction gear 71 having a ratio such as 300:1. The motor and tachometer may comprise a standard servo motor-generator. A conventional size 11 standard servo motor-generator was found to function satisfactorily in this application. Tachometer 69 has an alternating current output proportional in magnitude to the speed of rotation of the motor 66. This tachometer output is the differentiated output of the motor which is $\dot{h}_p$ (the programmed descent rate).

The output of tachometer 69 is fed through scaling resistor 73 to voltage amplifier 75. Opposite phases of the alternating current output of amplifier 75 are fed respectively through one of summing resistors 18 in a negative feedback path to the amplifier and servo just described and to one end of scaling potentiometer 52. The servo negative feedback path is utilized to stabilize the system and to assure linear operation.

The output shaft 87 of reduction gear 71 is utilized to drive the arm of programmer potentiometer 76. The arm of this potentiometer is thus driven in accordance with the amount of rotation of motor 66 and the input to the programmer. The voltage at the arm of potentiometer 76 is a function of the voltage determined by the B+ supply voltage at terminal 78 and the voltage divider network comprising resistor 82 and potentiometers 76 and 84. Potentiometer 84 may be adjusted to give the desired calibrated voltage output at the arm of potentiometer 76 for a given potentiometer arm position as determined by drive shaft 87.

The voltage at the arm of potentiometer 76 is scaled by resistor 81 and fed to modulator 89. The D.-C. voltage output of altimeter 12 is also fed to modulator 89. This voltage is proportional to the actual altitude of the aircraft as determined by the altimeter which may be a conventional type such as the military type AN/APN-1. The voltage output of altimeter 12 is fed to modulator 89 and compared with the output of programmer 19 fed from the arm of potentiometer 76 through resistor 81. The altimeter output is subtracted from the programmer output and the difference becomes the modulating voltage. Modulator 89 may be a conventional bridge modulator utilizing a suitable alternating current carrier. A suitable modulator for this purpose is shown on page 553 of The Radio Engineer's Handbook, first edition, by Frederick E. Terman. The modulated alternating current output of the modulator is coupled through coupling capacitor 96 and scaling resistor 97 to voltage amplifier 98 which may be similar in design to voltage amplifier 63.

The programmer also includes a cam stack 61 which actuates the various switches in the device in proper time sequence. This actuation process is instituted with rotation of motor 66, which commences at the start of the calibrate mode. The details of how this is accomplished will be explained infra. Shaft 87 drives gear reduction device 101 which provides suitable gear reduction, such as 11:1 for example, in driving the cam stack 61. The elements of the sequencing-switching system utilized are shown in FIG. 4 and will be explained in detail further on in the specification. It need only be said here that the cam stack may be of any conventional design which will actuate the various switches at the proper predetermined time. The various mechanical connections from the cam stack to the several switches are omitted from FIG. 3 in order to avoid confusion in the drawing.

As previously explained, during the calibrate mode the memorizer summates the error signal generated. This error signal or altimeter-programmer difference signal is taken from amplifier 98 and fed through switch 31 and scaling resistor 25 to the memorizer 27.

Within the memorizer, this error signal is fed through capacitor 102 to voltage amplifier 103 (similar in design to amplifier 63) where it is amplified to an adequate magnitude to drive power amplifier 105. Power amplifier 105 drives motor 106, which in turn simultaneously drives gear reduction device 107 and tachometer 108 by means of drive shaft 110. Motor 106 and tachometer 108 may comprise a standard size 11 servo motor-generator similar to that suggested for motor 66 and tachometer 69. Gear reduction device 107 may reduce by 1117 times the output of shaft 110 and drive the arm of potentiometer 112. This output is also mechanically coupled to the arm of potentiometer 52 through coupling shaft 136.

The output of the nominal descent rate source 17 which is an alternating voltage of predetermined magnitude is fed between the ends of potentiometer 112. The voltage between the arm and bottom end of potentiometer 112 will therefore be a percentage of this nominal descent rate source voltage as determined by the position of the arm. As motor 106 turns at a speed proportional to the amount of error signal fed from amplifier 98, the arm of potentiometer will move accordingly. In effect, it will integrate all the error signals received by the memorizer during the calibrate mode and will have an output voltage between its arm and bottom end proportional thereto. With switch 13 in the "cal and control" position, this voltage, which is a percentage of the nominal descent rate source voltage, is summed with the nominal descent rate source voltage and the feedback output of amplifier 75 in summing resistors 18.

Tachometer 108, as driven by shaft 110, produces an output signal proportional to the speed of rotation of motor 106. This signal, which is the differentiated altitude error signal, $\dot{h}_e$, is fed through scaling resistor 114 to input coupling capacitor 102. It thereby provides a negative feedback loop which stabilizes the operation of the memorizer circuitry.

As previously described, during the control mode the motor 106 has no input drive and the arm of potentiometer 112 remains in its last position before the start of the control mode providing a constant output which is a percentage of the nominal descent rate source output. This last fixed position of the arm of potentiometer 112 represents the integral or sum of the error signals fed to the memorizer during the calibrate mode and it is this signal that is used to drive the programmer.

A feedback altitude error signal, $h_e$ is fed through scaling resistor 23 to the input of programmer 19 in the calibrate mode. The function of this feedback path in providing for more rapid response in the servo loop has been previously described.

Switch 32, during the calibrate mode, as indicated, grounds the inputs which receive the altitude error signal $h_e$ during the control mode. When the control mode starts, a cam in cam stack 61 drives switch 32 to the control position. The altitude error signal $h_e$ is appropriately scaled by scaling resistors 50 and fed through coupling capacitor 115 to summing amplifier 43.

Tilted accelerometer 47 is utilized to generate acceleration signals proportional to the aircraft's acceleration in both the horizontal and vertical direction. The angle of tilt of the sensitive axis of the accelerometer for ideal output can be determined experimentally for each aircraft. In the U.S. Air Force type T-33 airplane, for example, the sensing axis of the accelerometer lies in a plane containing this longitudinal axis of the aircraft and normal to the pitch axis thereof an angle of about 38 degrees with respect to the longitudinal axis of the aircraft was found to be satisfactory (measured in a plane normal to the pitch axis). An accelerometer having a range of zero to twice the acceleration of gravity and a scaled alternating current output of about 2.5 volts, R.M.S. per gravity unit was found to be adequate. A Wianco Company type 115 accelerometer was found to operate satisfactorily.

The output of tilted accelerometer 47 is demodulated in demodulator 116. Demodulator 116 may be any phase sensitive demodulator operating with a reference alternating voltage. The same circuit suggested for modulator 89 (p. 553 of Terman's Radio Engineers' Handbook) may be used as a demodulator if the reference voltage is applied in place of the carrier voltage. The reference voltage must be in phase with the accelerometer excitation voltage to assure proper polarity of the demodulator output.

The output of demodulator 116 is a direct current signal proportional in amplitude and polarity to the magnitude and sense, respectively, of the output of the tilted accelerometer 47. This signal is filtered by the resistance-capacitance circuit comprising resistor 117 and capacitor 119 and fed through resistor 120 to the washout circuitry comprising capacitor 121 and the input resistance of modulator 123. The washout circuitry is designed to have a time constant of approximately 8 seconds. It thereby effectively "washes out" long term changes in acceleration giving an input to modulator 123 representative only of the acceleration during approximately 8 second periods. At the same time, the washout circuitry effectively "remembers" accelerations for about 8 seconds after they occur and thereby allows adequate time for the pilot or autopilot to modify the plane's flight to compensate for them. By "washing out" long term accelerations, overcompensation is minimized.

Modulator 123 is similar in function to modulator 89 (previously described) and may be of the same design. In the modulator the washed out direct current acceleration signal is modulated upon an alternating current carrier. This modulated signal is fed through coupling capacitor 125 appropriately scaled by scaling resistor 126 and amplified by conventional voltage amplifier 128. The output of amplifier 128 is fed through resistor 129 and capacitor 115 to summing amplifier 43 where it is summed with the altitude error signal, $h_e$.

An alternating bias voltage which provides the approximate pickoff excitation voltage required by the integrating rate gyro 36 is provided by alternating current source 131. This source should furnish the approximate excitation voltage required by the particular integrating rate gyro 36 which is utilized and might be in the neighborhood of 13 volts R.M.S. Potentiometer 132 may be used to adjust this voltage to the exact requirements. Resistor 133 acts as a current limiter assuring that the current fed to the integrating rate gyro does not exceed predetermined limits. This bias voltage from source 131 is fed through capacitor 115 to summing amplifier 43.

When the programmer indicates that the flare initiation altitude level has been reached in the programmed flight, an appropriate cam in cam stack 61 will throw switch 55 to the 60-foot position. This will connect the voltage at the arm of potentiometer 52 through resistor 135 and coupling capacitor 115 to summing amplifier 43. The voltage at the potentiometer arm is the product of the voltage fed to this potentiometer from amplifier 75 and the position of the potentiometer arm. The output of amplifier 75, as previously explained, is a function of the programmed descent rate, $\dot{h}_p$. It is to be noted that the output fed to potentiometer 52 should be 180 degrees out of phase with the negative feedback signal fed to resistor summing network 18. The arm of potentiometer 52 is positioned by drive shaft 136 which moves according to the motion of memorizer motor 106. As previously explained, when entering the control mode this memorizer motor ceases to run and its output shaft is fixed in its last position before entering the control mode. This position represents the sum total of the error signals received by the memorizer during the calibrate mode. The arm of potentiometer 52 should be offset by an amount proportional to the nominal rate of descent voltage, $\dot{h}_{nom}$. As the nominal voltage plus the error voltage from the memorizer is the programmed rate of descent which operates the programmer during the control mode, the sum of these two as represented by the shaft position of potentiometer 52 is equal to this programmed rate of descent, $\dot{h}_p$. The voltage at the arm of potentiometer 52 is therefore a function of $\dot{h}_p^2$. Scaling is further provided in potentiometer 52 to divide the signal at its arm by an amount equal to $\dot{h}_{nom}$, making the total arm output a function of $$\frac{\dot{h}_p^2}{\dot{h}_{nom}}$$

At all altitudes below 60 feet, this signal is fed through to summing amplifier 43 where it is summed with the other aforementioned signals and is utilized to achieve the necessary flare landing path.

The integrating rate gyro 36 integrates all of the signals summed in summing amplifier 43, and in addition generates its own pitch rate signal which is integrated along with the other signals. The output of amplifier 43 is coupled to a suitable torque generator in the integrating rate gyro through capacitor 142. An integrating rate gyro such as the HIG-5 by Minneapolis-Honeywell Company has been found to operate satisfactorily in this application. Such an integrating rate gyro is described in patent number 2,752,791, issued July 3, 1956, inventors John J. Jarosh, Clarence A. Haskell, and William W. Dunnell. The output of the integrating rate gyro 36 is fed through resistor 145 and capacitor 146 to summing amplifier 34.

A negative feedback path is provided from the output of the integrating rate gyro 36 to the input of summing amplifier 43. This negative feedback path comprises resistors 171, 172, and 173. Switch 176, during the calibrate mode, parallels resistor 171 with resistor 172 which may have about one-tenth of the resistance of resistor 171. This provides enough feedback to reduce the memory of the integrating rate gyro to near zero. Thus, at the end of the calibrate mode there will be no held over "memorized" signal output from the integrating rate gyro. With the commencement of the control mode, switch 176 is thrown to the "control" position by an appropriate cam in the programmer and one end of resistor 172 is grounded. This effectively produces a delay time constant of about 10 seconds in the feedback path and the integrating rate gyro will therefore have a 10-second memory during the control mode. This will tend to make the integrating rate gyro indicate an average signal output during this period rather than each sharp individual signal change. None of the signals received during the calibrate mode will be reflected in this output.

A signal proportional to the position of the aircraft control stick is generated in stick position signal source 38. This signal source comprises a B+ voltage of suitable magnitude fed to terminal 149 and through resistor 148 and potentiometer 150 to ground. The arm of potentiometer 150 is positioned by a mechanical signal coupled from the aircraft control stick producing a signal voltage proportional to the stick position at the potentiometer arm. This stick position signal is scaled and "washed out" in washout circuitry 48 comprising capacitor 153 and resistor 155. This washout circuit functions similarly to the previously described for the tilted accelerometer. It effectively "washes out" long term changes in stick position and presents changes of stick position as a signal having a time constant approximately two seconds to modulator 157.

Modulator 157 may be similar in design to modulator 89 previously described, and effects the modulation of the direct current washed out stick position signal upon an appropriate alternating current carrier. This modulated signal is coupled through capacitor 159, resistor 160, which appropriately scales its magnitude, and coupling capacitor 146 to summing amplifier 34.

A pitch rate gyro 40 is used to generate a pitch rate signal in addition to that generated by integrating rate gyro 36. Excitation voltage for the pickoff of this pitch rate gyro is provided by alternating current source 163. The magnitude of this excitation voltage can be adjusted through potentiometer 164 which should be set so that there is zero signal output from pitch rate gyro 40 when there is no pitch rate input signal to the gyro. The excitation voltage is fed to the rate gyro through resistors 166 and 41. The pitch rate gyro may be any suitable rate gyro having an alternating current output. The type S–20A by the American Gyro Company has been found satisfactory. The pitch rate signal output of the gyro is appropriately scaled by scaling resistor 41 and fed through coupling capacitor 146 to summing amplifier 34.

Summing amplifier 34 summates all of the correction and error signals which are to be fed to the control device. The output of amplifier 34 is an alternating current signal having a phase and a magnitude proportional to the sum total of all of these signals. The output of amplifier 34 is fed to demodulator 179. Demodulator 179 may be similar in design to demodulator 116. It is important that the reference voltage utilized in this phase sensitive demodulator be in phase with the original carrier voltages on which all of the correction and error signals were modulated. Of course, to achieve this it is necessary that all of the original carriers were in phase with each other. The output of demodulator 179 is a direct current signal having a magnitude and polarity proportional to the sum total of all the error and correction signals.

When the control mode is commenced, switch 42 is thrown from the calibrate to the control position by an appropriate cam in the programmer. Switch 181 will ordinarily be in the "OK" position if the equipment is operating normally. The operation of this switch will be explained, along with the explanation of the switching system, later on in the specification. With switch 42 in the "control" position and switch 181 in the "OK" position, the direct current output of demodulator 179 will be coupled through resistors 182 and 183 to control device 16. The control device 16, as previously explained, is utilized to effect the landing, either automatically or by pilot action. Resistors 182 and 183, along with limiter 185, are utilized to prevent the output signal from the demodulator from exceeding predetermined limits beyond which the signal might be high enough to damage circuitry within the control device. The limiter may be of conventional diode limiter design, and as it has only protective functions, is not absolutely essential to the functioning of the system.

Referring now to FIG. 4 which illustrates a sequencing and switching system which may be used in the device of this invention, the radar altimeter 12 should be of such a design that it will adequately receive ground reflection signals from at least 800 feet altitude to 150 feet altitude. Relay 194 has its coil input terminals 192 and 193 connected to keyer 235 which may be a simple vacuum tube circuit which will conduct with a predetermined minimum strength signal from the video output circuit of altimeter 12. This circuitry should be responsive to the altimeter video detector output and should provide sufficient voltage between terminals 192 and 193 to actuate relay 194 when there is a radar altimeter signal of a predetermined strength or higher.

As we enter effective radar altimeter range (1000 feet for the AN/APN–1) the altimeter will start to operate and if it is operating normally there will be a high enough signal to operate keyer 235 which will in turn actuate relay 194 and throw this relay's contact arm 194a from the "Fail" to the "OK" position. The pilot, to enable initiation of the calibrate mode, must throw switch 196 from the "standby" to the "land" position. This completes the current feed path to the actuator coil of delay relay 197, the path starting at terminal 198, continuing through resistor 199, the relay coil, the contact arm 194a of relay 194, and switch 196 to ground. Delay relay 197 has a delay circuit comprising resistor 199 and capacitor 201 which will delay its action approximately one-half second. This delay circuit is utilized to prevent deactuation of the delay relay when radar altimeter input is only lost instantaneously or for perhaps just a few cycles. The "calibrate-control" relay 13 can be actuated to initiate the calibrate mode only if switch 237 is closed. This switch will be automatically closed at 800 feet altitude by cam 238. The D.-C. output of the altimeter is modulated on an A.-C. carrier in modulator 240 which may be similar in design to modulator 89. The output of the modulator drives servo amplifier 241 which in turn drives servo motor 242. The output shaft of servo motor 242 will drive cam 238 to actuate switch 237. As the amount of rotation of motor 242 is a direct function of the altitude output signal of altimeter 12, the cam 238 can be pre-positioned to actuate switch 237 when the output of the altimeter has run down to 800 feet altitude from its operational starting point which may, for example, in the AN/APN–1 be 1,000 feet altitude. When delay relay 197 is actuated, contact arms 197a and 197b will be connected together, thereby actuating the coil of calibrate and control relay 13 by completing the direct current path from terminal 205 through switch 237 (closed at 800 feet by cam 238), the relay coil, and switch 196 to ground. Contacts 13a and 13b of the relay come together and latch the relay providing an alternative circuit from the coil through switch 196 to ground. These two contacts also provide an energizing path to the 800-foot indicator light 207. Contacts 13e, 13f, and 13g may be utilized to connect the nominal descent rate source to the programmer.

When the altitude programmer reaches 150 feet the 150-foot programmer cam will actuate switch 216. This will actuate the 150-foot relay coils 218, 219, 220, and 221. All of the contacts associated with these relay coils are not shown but their operation is self-evident. At the same time 150-foot light 223 will go on while the 800-foot light 207 will be turned off with the closing of contact arms 218a and 218b and the opening of the connection between contact arms 218a and 218c.

When the altitude programmer reaches 60 feet, the programmer cam stack will throw switch 216 to de-energize the control relays thereby connecting contact arms 218d and 218e and energizing the 60-foot relay 320. The 60-foot relay coil will effectively close the 60-foot switch contact 55 (shown only in Figs. 1 and 3).

At touchdown switch 232 which is mechanically connected to the shock absorbers on the aircraft landing wheels will open thereby disconnecting the return ground connection to all of the relays and unlatching the system.

Should a failure occur at any time, the contact arm 194a of switch 194 will go to the "Fail" position. After approximately a one-half second delay in delay relay 197, this delay relay will de-energize, thereby energizing fail relay 211 by completion of the circuit starting at terminal 212 running through the fail relay coil, contact arms 197c and 197d, contact arms 13c and 13d, the "Fail—OK" switch 194 and "standby—land" switch 196 to ground. This de-energizes all the other lights and at the same time energizes the "Fail" light 214. Unlatching and re-set of the system can be accomplished at any time by placing the standby—land switch 196 in the "standby" position.

It is to be noted that the sequencing switching system shown is only one of many that might be utilized in this invention. The one shown is for illustrative purposes only.

Although the invention has been described and illustrated in detail, it is to be clearly understood that the same is by way of illustration and example only and is not to be taken by way of limitation, the spirit and scope of this invention being limited only by the terms of the appended claims.

We claim:
1. In an aircraft landing system, means for generating a signal indicative of instantaneous altitude of said aircraft, program means for generating a program signal indicative of the integral of the input thereto, summing means responsive to said program and altitude means for algebraically combining said altitude and program signals to provide an error signal, memory means for generating and storing a rate signal indicative of the integral of the input thereto, means for transmitting said rate signal as an input to said program means, a connection from said summing means to said memory means input, an output device, and means for simultaneously disabling said connection and coupling said error signal to said output device.

2. In an aircraft landing system, means for deriving and storing a signal indicative of the rate of descent of said aircraft during a first period of time, said deriving and storing means including means for deriving an altitude signal indicative of the altitude of said aircraft during a subsequent period of time, said deriving and storing means further including means for integrating said stored signal and means responsive to said altitude signal and said integrated stored signal for providing an indication of the instantaneous deviation of said altitude signal from a programmed value thereof.

3. In combination, means providing signals indicating actual altitude, programmer means connected to provide signals representing programmed altitude, differential means connected to receive and compare said previously mentioned signals and provide signals indicating altitude error, storage means for integrating said altitude error signals, means providing signals representing nominal descent rate, and summing means connected to receive the integrated output signal of said storage means and said means providing signals representing nominal descent rate, said programmer means being connected to receive the output of said summing means.

4. Landing control apparatus for an aircraft comprising an altimeter for generating a first signal indicative of the actual altitude of said aircraft, program means for generating a programmed altitude signal, memory means responsive to said altimeter and program means during a first period of time for generating and storing a deviation signal indicative of the average difference between the rates of change of said actual and programmed altitude signals during said first period, said program means being responsive to said stored deviation signal during a period subsequent to said first period, a control device, and algebraic summing means connected to said altimeter and said program means for transmitting the difference between said actual and programmed altitude signals to said control device during said subsequent period.

5. For use in an airborne vehicle, means for generating a signal proportional to the altitude of said vehicle, means for deriving a signal proportional to programmed altitudes, means for comparing said signals and deriving the difference signal thereof, means for integrating said difference signal, sequencing-switching means for making and breaking predetermined electrical connections in predetermined sequence and time relationship, a control device, the output of said integrating means being connected to drive said programmed altitude deriving means, said sequencing-switching means alternatively connecting the output of said difference deriving means to said integrating means or to said control means in predetermined sequence and time relationship, whereby said vehicle may be flown to effect a landing on a predetermined path to touchdown.

6. The device recited in claim 5 wherein said means for generating a signal proportional to programmed altitudes comprises a programmer, said programmer including means for operating said sequencing means.

7. An instrument landing system for landing an airborne vehicle comprising an altimeter having an output signal proportional to the altitude of said vehicle, a programmer having an output signal proportional to programmed altitudes, means connected to said programmer and said altimeter for deriving an altitude error signal proportional to the difference between said output signals, a memorizer connected in circuit with said altitude error signal deriving means and driven in response thereto, the output of said memorizer being fed to the input of said programmer, a control device, switch means for simultaneously connecting a signal proportional to the output of said altitude error signal deriving means to said control device and disconnecting said memorizer from said altitude error signal deriving means in response to said programmer whereby said airborne vehicle is flown to zero out said altitude error signal to effect a landing.

8. In a system for landing an aircraft on a programmed path utilizing calibrate and control modes of operation, an altimeter having an output signal indicative of the altitude of said aircraft, a programmer having an output proportional to programmed altitudes, comparing means for deriving the difference between the outputs of said programmer and said altimeter, a memorizer connected in circuit with said programmer, said programmer being responsive to the output of said memorizer, switching means connected to operate in response to said programmer, said switching means connecting said comparing means in circuit with said memorizer only during said calibrate mode, an instrument landing system receiver responsive to ground control signals, a control device, said switching means connecting said control device to said instrument landing system receiver during said calibrate mode or alternatively to said comparing means during said control mode, whereby the aircraft may be flown utilizing said control device to effect a landing with a predetermined touchdown point.

9. An instrument landing system for landing an airborne vehicle comprising an altimeter having an output signal proportional to the altitude of said vehicle, a programmer having an output signal proportional to programmed altitudes, means connected to said programmer and said altimeter for deriving an altitude error signal proportional to the difference between said output signals, a memorizer driven in response to said altitude error signal deriving means, the output of said memorizer being fed to the input of said programmer, a summing device, switch means for disconnecting the output of said altitude error signal deriving means from said memorizer and connecting the output of said signal deriving means to said summing device in response to said programmer at all altitudes below a predetermined programmer altitude, a control device, and second switch means for connecting a signal proportional to the output of said summing device to said control device in response to said programmer whereby said control device has an input signal proportional to the summated error signals and said airborne vehicle may be flown to zero out said error signals to effect a landing.

10. The device as recited in claim 9 including means for deriving flight compensating signals, and third switch means for coupling the output of said compensating signal deriving means to said summing device in response to said programmer.

11. In an aircraft landing system, an altimeter, said altimeter having an output signal proportional to the altitude of said aircraft, a first servo amplifier, a first servo motor driven by said first servo amplifier, a first potentiometer, the arm of said first potentiometer being mechanically coupled to the output shaft of said first servo motor, a voltage source being connected across the ends of said first potentiometer, a modulator, the arm of said first potentiometer and said altimeter output terminals being connected to the modulation input terminals of said modulator, a cam stack mechanically driven by the output shaft of said first servo motor, a control device, a second servo motor, a second servo amplifier driving said second servo motor, a second potentiometer, the arm of said second potentiometer being driven by said second servo motor, the arm of said second potentiometer being coupled to the input of said first servo amplifier, a first switch operative in response to said cam stack, said first switch alternatively coupling the output terminals of said modulator to the input terminals of said second servo amplifier or uncoupling said modulator output terminals therefrom, an ILS receiver, and a second switch responsive to said cam stack, said second switch coupling said control device alternatively to the output terminals of said modulator or to the output terminals of said ILS receiver.

12. In an aircraft landing system, an altimeter, said altimeter having an output signal proportional to the altitude of said aircraft, a first servo amplifier, a first servo motor driven by said first servo amplifier, a first potentiometer, the arm of said first potentiometer being mechanically coupled to the output shaft of said first servo motor, a voltage source being connected across the ends of said first potentiometer, a modulator, the arm of said first potentiometer and said altimeter output terminals being connected to the modulation input terminals of said modulator, a control device, a second servo motor, a second servo amplifier driving said second servo motor, a second potentiometer, the arm of said second potentiometer being driven by said second servo motor, the arm of said second potentiometer being coupled to the input of said first servo amplifier, means for alternatively coupling the output terminals of said modulator to the input terminals of said second servo amplifier or uncoupling said modulator output terminals therefrom, an ILS receiver, and means for coupling said control device alternatively to the output terminals of said modulator or to the output terminals of said ILS receiver.

13. An instrument landing system for landing an airborne vehicle comprising an altimeter having an output signal proportional to the altitude of said vehicle, a programmer having an output signal proportional to programmed altitudes, means connected to said programmer and said altimeter for deriving an altitude error signal proportional to the difference between said output signals, a memorizer driven in response to said altitude error signal deriving means, the output of said memorizer being fed to the input of said programmer, a summing device, switch means for disconnecting the output of said altitude error signal deriving means from said memorizer and connecting the output of said signal deriving means to said summing device in response to said programmer at all altitudes below a predetermined programmed altitude, means for generating a signal proportional to stick position of said vehicle, a pitch rate gyro, an integrating rate gyro, the outputs of said stick position generating means, said pitch rate gyro and said integrating rate gyro being fed to said summing device, a control device, and second switch means for connecting a signal proportional to the output of said summing device to said control device in response to said programmer, whereby said control device has an input signal proportional to the summated error signals and said airborne vehicle may be flown to zero out said error signals to effect a landing.

14. The system recited in claim 13 wherein said control device is an autopilot.

15. In an instrument landing system for landing an airborne vehicle, said system having calibrate and control modes of utilizing a glide slope path receiver, an altimeter having an output signal proportional to the altitude of said vehicle, a programmer, means for generating a signal proportional to a predetermined nominal rate of descent of said vehicle, the output of said generating means being fed to said programmer, said programmer having an output responsive thereto, means for comparing the outputs of said programmer and said altimeter and deriving an altitude error signal proportional to their difference, a memorizer whose output is fed to the input of said programmer, a first switch adapted to respond to said programmer, said first switch connecting the output of said comparing and deriving means to said memorizer during the calibrate mode and disconnecting said comparing and deriving means output from said memorizer during the control mode, a control device, and a second switch, said second switch separately connecting said glide path receiver during the calibrate mode and said comparing and deriving means during the control mode in circuit with said control device, whereby said control device has an output signal proportional to the error signal and said vehicle may be flown to zero out said error signal to effect a landing.

16. In an instrument landing system for landing an airborne vehicle, said system having calibrate and control modes and utilizing a glide slope path receiver, an altimeter having an output signal proportional to the altitude of said vehicle, a programmer, means for generating a signal proportional to a predetermined nominal rate of descent of said vehicle, the output of said generating means being fed to said programmer, said programmer having an output responsive thereto, means for comparing the outputs of said programmer and said altimeter and deriving an altitude error signal proportional to their difference, the output of said comparing and deriving means being fed to the input of said programmer, a memorizer, the output of said memorizer being fed to the input of said programmer, a first switch adapted to respond to said programmer, said first switch connecting the output of said comparing and deriving means to said memorizer during the calibrate mode and disconnecting said comparing and deriving means output from said memorizer during the control mode, a control device, a summing device, a second switch adapted to respond to said programmer, said second switch alternatively connecting said glide slope path receiver during the calibrate mode and said summing device during the control mode in circuit with said control device, means for generating a signal which is a function of the stick position of said vehicle, an integrating rate gyro and a pitch rate gyro, the outputs of said stick position generating means, said pitch rate gyro, said integrating rate gyro and said comparing and deriving means being fed to said summing device, whereby said control device has an input signal proportional to the summated signals and said vehicle is flown to zero out said signals to effect a landing.

17. The system as recited in claim 16 wherein is included an accelerometer and means for deriving a signal which is a function of $$\frac{\dot{h}_\mathrm{p}^2}{\dot{h}_\mathrm{nom}}$$

and wherein said accelerometer, said means for deriving a signal which is a function of $$\frac{\dot{h}_\mathrm{p}^2}{\dot{h}_\mathrm{nom}}$$

and said means for deriving an altitude error signal are connected in circuit with said integrating rate gyro.

18. The system as recited in claim 16 wherein said control device is an autopilot.

19. The system as recited in claim 16 wherein said control device is an indicator.

20. In a system for landing an aircraft on a programmed path utilizing calibrate and control modes of operation, an altimeter, having an output signal indicative of the altitude of said aircraft, a programmer having an output proportional to programmed altitudes, comparing means for deriving the difference between the outputs of said programmer and said altimeter, a memorizer connected in circuit with said programmer, a switching device adapted to operate in response to said programmer, said switching device connecting said comparing means in circuit with said memorizer during said calibrate mode, an instrument landing system receiver responsive to ground control signals, a control device, means for generating a signal proportional to the pitch rate of said aircraft, means for generating a signal proportional to the stick position of said aircraft, and a summing device, said pitch rate generating means and said stick position generating means being connected in circuit with said summing device, said switching device connecting said comparing means in circuit with said summing device during said control mode, said switching device further connecting said control device alternatively to said instrument landing system receiver during said calibrate mode and to said summing device during said control mode, whereby the aircraft may be flown utilizing said control device to effect a landing with a predetermined touchdown point.

21. In a system for landing an aircraft on a programmed path utilizing calibrate and control modes of operation, an altimeter, having an output signal indicative of the altitude of said aircraft, a programmer having an output proportional to programmed altitudes, comparing means for deriving the difference between the outputs of said programmer and said altimeter, a memorizer connected in circuit with said programmer, a switching device adapted to operate in response to said programmer, said switching device connecting said comparing means in circuit with said memorizer during said calibrate mode, an instrument landing system receiver responsive to ground control signals, a control device, means for generating a signal proportional to acceleration of said aircraft, means responsive to said memorizer for generating a signal which is a function of the square of the programmed rate of descent of said aircraft, a first summing device, the output of said acceleration signal generating means being connected in circuit with said first summing device, said switching device connecting said comparing means and said means responsive to said memorizer in circuit with said first summing device during said control mode, means for integrating the output of said first summing device, and a second summing device, said integrating means being connected in circuit with said second summing device, said switching device connecting said comparing means in circuit with said second summing device during said control mode, said switching device further connecting said control device alternatively to said instrument landing system receiver during said calibrate mode and to said second summing device during said control mode, whereby the aircraft may be flown utilizing said control device to effect a landing with a predetermined touchdown point.

22. In a system for landing an aircraft on a programmed path utilizing calibrate and control modes of operation, an altimeter, having an output signal indicative of the altitude of said aircraft, a programmer having an output proportional to programmed altitudes, comparing means for deriving the difference between the outputs of said programmer and said altimeter, a memorizer connected in circuit with said programmer, a switching device adapted to operate in response to said programmer, said switching device connecting said comparing means in circuit with said memorizer during said calibrate mode, an instrument landing system receiver responsive to ground control signals, a control device, means for generating a signal proportional to acceleration of said aircraft, means responsive to said memorizer for generating a signal which is a function of the square of the programmed rate of descent of said aircraft, a first summing device, the output of said acceleration signal generating means being connected in circuit with said first summing device, said switching device connecting said comparing means and said means responsive to said memorizer in circuit with said first summing device during said control mode, means for integrating the output of said first summing device, means for generating a signal proportional to the pitch rate of said aircraft, means for generating a signal proportional to the stick position of said aircraft, and a second summing device, said integrating means, said pitch rate generating means and said stick position generating means being connected in circuit with said second summing device, said switching device connecting said comparing means in circuit with said second summing device during said control mode, said switching device further connecting said control device alternatively to said instrument landing system receiver during said calibrate mode and to said second summing device during said control mode, whereby the aircraft may be flown utilizing said control device to effect a landing with a predetermined touchdown point.

References Cited in the file of this patent

UNITED STATES PATENTS

| | | |
|---|---|---|
| 2,548,278 | Wirkler | Apr. 10, 1951 |
| 2,592,173 | Noxon et al. | Apr. 8, 1952 |
| 2,800,292 | Moseley | July 23, 1957 |
| 2,808,999 | Chenery | Oct. 8, 1957 |
| 2,830,291 | Hecht et al. | Apr. 8, 1958 |
| 2,834,564 | Perkins, et al. | May 13, 1958 |
| 2,841,345 | Halpert et al. | July 1, 1958 |
| 2,861,757 | Callen et al. | Nov. 25, 1958 |
| 2,940,032 | Protzen | June 7, 1960 |

UNITED STATES PATENT OFFICE
CERTIFICATION OF CORRECTION

Patent No. 2,987,275                                June 6, 1961

Alexander J. Moncrieff-Yeates et al.

It is hereby certified that error appears in the above numbered patent requiring correction and that the said Letters Patent should read as corrected below.

Column 2, line 42, insert the equation number "(5)"; column 6, line 26, for "by" read -- to --; column 10, line 56, for "the", first occurrence, read -- that --; column 12, line 38, for "320" read -- 230 --; column 13, line 64, for "sequencing" read -- sequencing-switching --; column 15, line 58, for "of" read -- and --.

Signed and sealed this 3rd day of April 1962.

(SEAL)
Attest:

ERNEST W. SWIDER                                          DAVID L. LADD
Attesting Officer                                         Commissioner of Patents